UNITED STATES PATENT OFFICE.

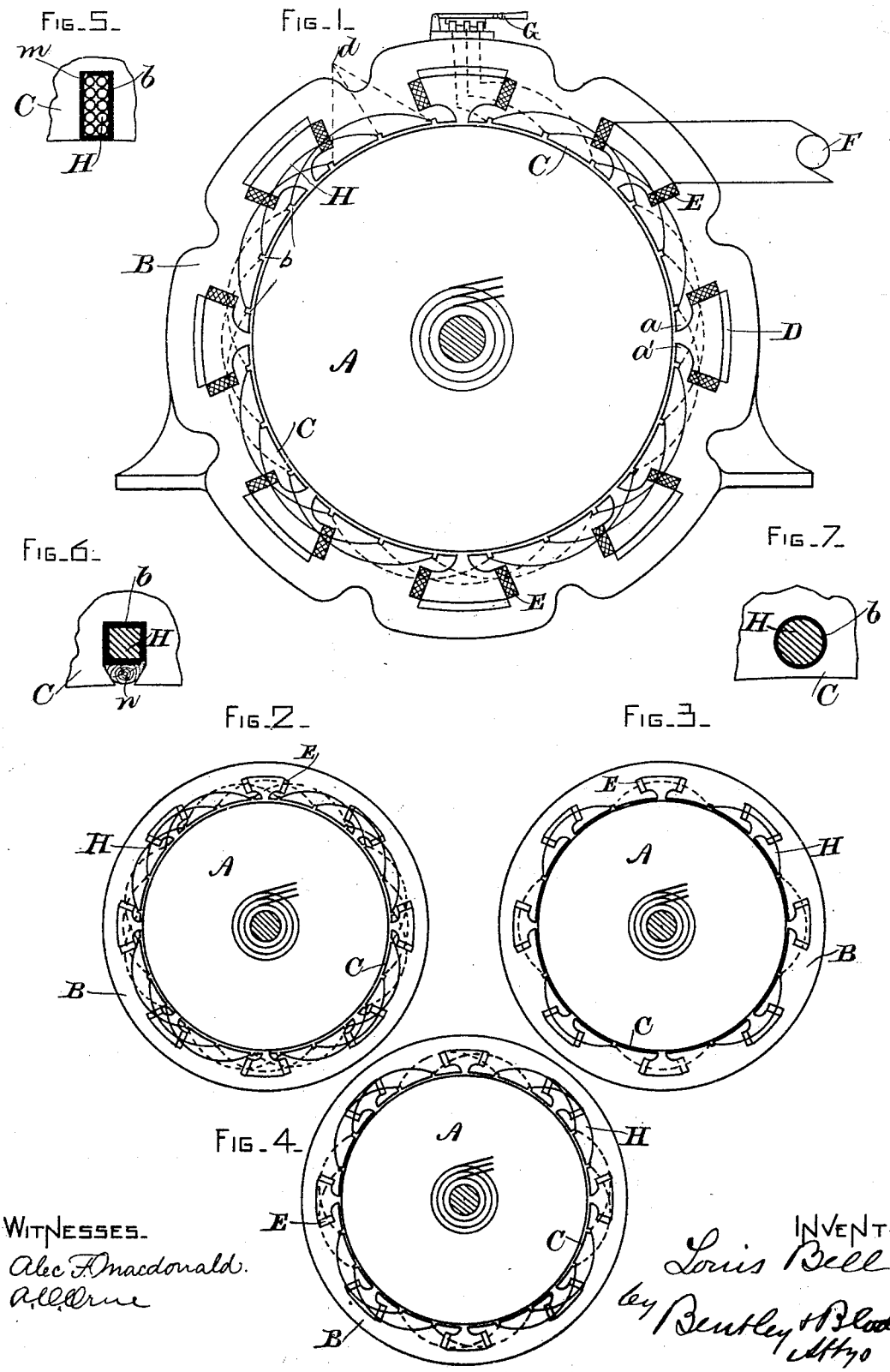

LOUIS BELL, OF BOSTON, MASSACHUSETTS, ASSIGNOR TO THE GENERAL ELECTRIC COMPANY, OF NEW YORK.

MULTIPHASE-CURRENT MOTOR.

SPECIFICATION forming part of Letters Patent No. 520,763, dated June 5, 1894.

Application filed November 4, 1892. Serial No. 450,956. (No model.)

*To all whom it may concern:*

Be it known that I, LOUIS BELL, a citizen of the United States, residing at Boston, county of Suffolk, State of Massachusetts, have invented a certain new and useful Improvement in Multiphase-Current Motors, of which the following is a specification.

My present invention relates to an improved multiphase current motor which may be relied upon to start from rest, and attain substantially synchronizing speed, and then, when once started, to continue running during the ordinary operation of the machine at as good advantage as possible. That the necessity for, and advantages of, the invention may be appreciated, I will add that under ordinary circumstances synchronous multiphase motors in which one member, either armature or field, is supplied with an alternating current, while the other is excited by a continuous current, will be found unable to start from rest, much less to attain synchronizing speed. This is true whether the alternating current be of single phase or of two, three or more phases. With multiphase motors, however, having a closed circuit winding on one member acted upon inductively by alternations of current in the other, this objection does not exist. It is, however, desirable to use in many cases the synchronous form of multiple phase motor separately excited by continuous currents, for the reason that its speed is absolutely synchronous with that of the generator instead of approximately so as in inductive motors. The construction also in such machines, especially of the larger sizes, is cheaper and more convenient. This may be done and the difficulty in starting overcome for while, as stated, the ordinary synchronous motor cannot be trusted to start of itself, if an additional inductive winding be applied to its field, it is found that this will enable it to start and attain the necessary synchronizing speed. Such a combination in a single machine of the synchronous and inductive forms of motor forms the subject of this invention, and I have found that to obtain the best results it is necessary to modify the usual construction of the field magnet, and to provide an efficient inductive winding, which improvements I have illustrated in the accompanying drawings and now proceed to describe.

Figure 1 shows in diagram a multiphase current motor patterned according to my invention. Figs. 2, 3 and 4 show likewise in diagram modified forms and arrangements of the inductive winding which may be employed, and Figs. 5, 6, and 7 are details suggesting how the inductive winding may be disposed.

The armature of the motor is illustrated at A, and the rings and brushes indicate that the motor selected for illustration is of the three-phase type, the armature being supplied with three-phase currents from any suitable source. The field magnet B is shown encircling the armature, though of course this arrangement may be reversed. It is provided with the usual circular row of poles C, but the pole faces are expanded so that they nearly but not quite meet one another, as at $a, a'$. Between the poles are broadened chambers D to which entrance for winding the coils E is had through the narrow spaces between adjacent pole faces. There is nothing original in the winding E, which I term a direct current type of winding, and which will ordinarily be supplied with current from a separate direct current generator F. The pole faces are channeled or recessed as at $b$, and in these channels are laid the inductive closed circuited winding H, shown in Fig. 1 as of the three-phase type, where the three windings have one set of ends all connected together at $d$, and their other ends are brought out separately to suitable switch contacts at which the circuit of each may be opened and closed by a common switch G. In this case the winding is a simple zig-zag three-phase winding, and the pole faces have widely expanded tips so that the three-phase winding is nearly as symmetrical as if the field winding was on a closed ring, and the inductive winding were the only one present. In Fig. 2 I have indicated also a three-phase inductive winding H, but instead of the three coils being joined at one end, each is closed-circuited upon itself. Instead of these three windings two or one may be applied. In case two are used, as is illustrated in Fig. 4, each may be short circuited upon itself or both may be jointly short circuited with or without switches in the connections as may be desired.

The direct current winding E will be arranged in a manner similar to what has already been the custom in synchronous motors. The inductive winding is best laid in grooves or channels in the pole faces, but it is desirable that, when energized, it be such as to produce as nearly as possible a continuous ring of poles around the field magnet.

In Fig. 5 the winding is simply laid in a channel $b$ cut in the pole faces and insulated therefrom by suitable insulating material $m$.

In Fig. 6 the shape given the mouth of the channel is somewhat different so as to receive a tapered wedge $n$ holding the winding H in place.

In Fig. 7 the pole face is not cut entirely through to its outer surface, but the winding is passed through channels or perforations therein, and while not the preferred form will give satisfactory results.

The motor operates in the manner already outlined. The inductive action of the multiphase currents, by which term I mean currents of two, three, or more phases, flowing in the armature upon the closed circuit field winding brings the motor to substantially synchronizing speed, when the circuit of the inductive winding may, if desired, be broken, and a permanent field excitation be secured by the direct current winding E in circuit with generator F. It is not necessary to break the circuit of the inductive winding at any time as at synchronizing speed there is no considerable induction in it. It will generally, however, be advisable so to do to avoid possibility of eddy currents.

What I claim as new, and desire to secure by Letters Patent, is—

1. In an electric motor, the combination of a member having a multiphase winding, a second member in intimate magnetic relation to the first, such second member having a winding by which direct currents are passed around the poles and substantially surrounding the first member and so disposed as to produce a practically continuous line of poles around the member upon which it is situated, and a closed-circuited winding also disposed in the pole faces so as to produce a continuous polarity substantially surrounding the first member, substantially as described.

2. In an electric motor, the combination of an armature having a multiphase winding and a field-magnet having a winding by which continuous current is passed around the field magnet poles and a closed-circuited winding, the closed-circuited winding being located in channels or grooves in the field-magnet adjacent to the armature and so arranged as to form substantially a ring of poles around the armature, as set forth.

3. In an electric motor, the combination of an armature having a multiphase winding with a field-magnet having a row of poles with expanded faces practically surrounding the armature, a winding by which a continuous current is passed around the field magnet poles upon such poles, and a closed-circuited winding arranged in grooves or channels in the pole faces, as set out.

4. In an electric motor, a field-magnet having a row of poles forming substantially a continuous ring, a winding thereon by which continuous current is passed around the field magnet poles, an independent closed-circuited winding in grooves in the pole faces, and a switch adapted to open or close such closed-circuited winding.

5. In an electric motor, a field-magnet or member having a row of poles with expanded faces nearly but not quite touching one another, a winding thereon by which continuous current is passed around the field magnet poles and having channels in the pole faces and one or more closed-circuited windings disposed in such channels and insulated from the pole faces, such closed-circuited winding arranged to form a substantially continuous line of poles around the field-magnet.

In witness whereof I have hereto set my hand this 28th day of October, 1892.

LOUIS BELL.

Witnesses:
  ALEC F. MACDONALD,
  N. F. HAYES.